Sept. 2, 1941.  C. GENDA  2,254,569
VEHICLE SIGNAL MEANS
Filed Aug. 19, 1939
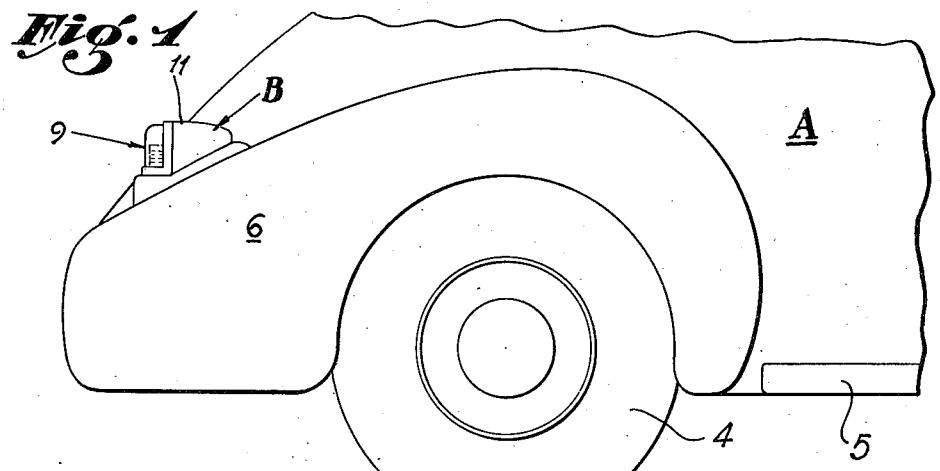
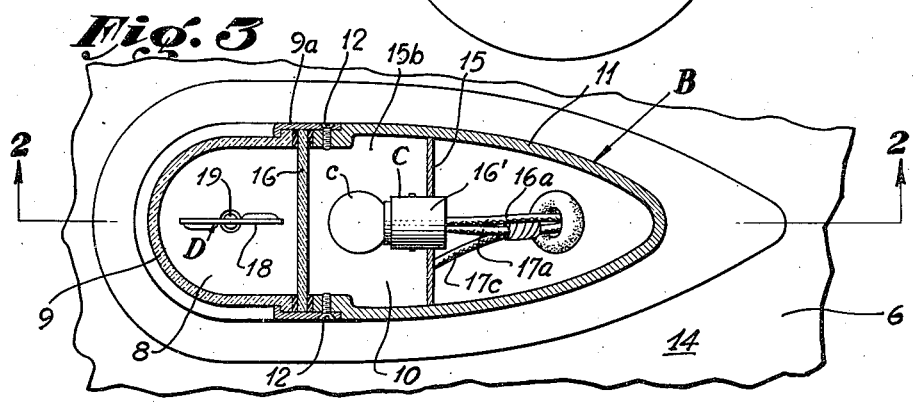
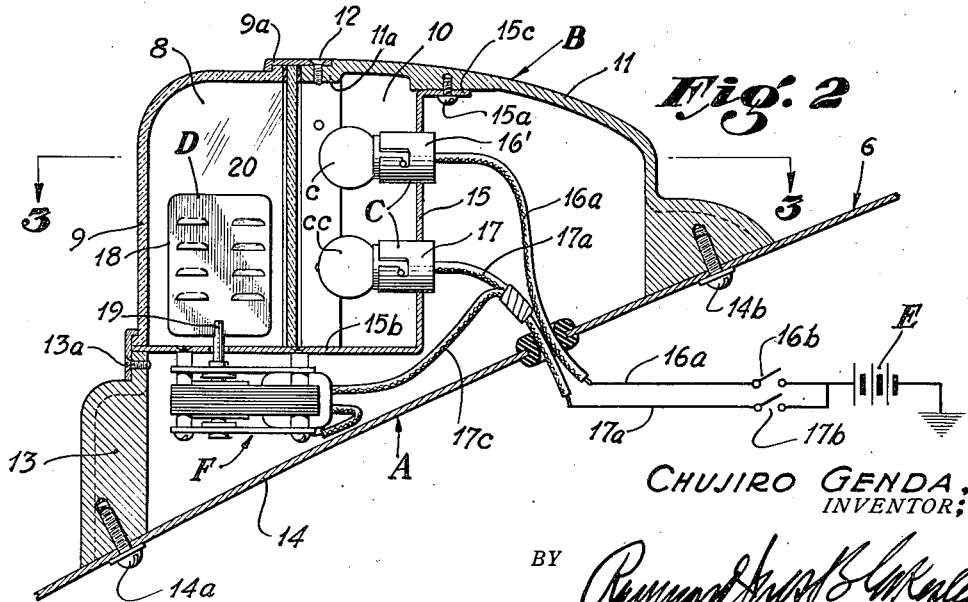
CHUJIRO GENDA,
INVENTOR
BY
ATTORNEY.

Patented Sept. 2, 1941

2,254,569

UNITED STATES PATENT OFFICE 2,254,569

VEHICLE SIGNAL MEANS

Chujiro Genda, Beverly Hills, Calif.

Application August 19, 1939, Serial No. 291,056

2 Claims. (Cl. 177—329)

This invention relates to vehicle signal means, and more particularly to signal means whereby there may be given an indication of the direction of turning or subsequent motion of a motor vehicle, or whereby the approach of the motor vehicle may be clearly and strikingly indicated. As many of these vehicle signals constituting such means, or lamps and accessories, may be provided as desired for a given car, and they may be interrelated and controlled for illumination in any desired manner, electrical lamps being preferable. The lamp is organized for the interruption of the projection of its light rays, preferably by the disposal of a light-ray-interrupter provided with suitable means for giving it movement to produce a more or less rapidly interrupted and restored projection of the lamp beam. In these general respects the invention constitutes an improvement upon or departure from the subject-matter of another application for U. S. Letters Patent filed by me December 14, 1938, for Signals, Serial No. 245,636 which became Patent No. 2,233,944 in March 4, 1941.

According to the present invention, certain interrelations and arrangements of parts and features are made which contribute to efficiency and serviceability of the signal means and not disclosed in the other application.

The invention has for its particular objects to provide means of the character stated which will be generally superior in point of simplicity and inexpensiveness of construction, taken in conjunction with facility of control, positiveness in action, durability and length of life, and which will be generally superior in efficiency and serviceability.

With the above and other objects in view, the invention consists in the novel and useful provision, formation, combination and association of parts, members and features, all as hereinafter described, shown in the drawing and finally pointed out in claims.

In the drawing, which discloses only one possible form of the invention, and in which corresponding parts are designated by the same characters in the several views:

Fig. 1 is a side elevation of a fragmentary and forward or rearward portion of a motor vehicle showing the improved signal means of the invention in one form installed in connection therewith;

Fig. 2 is an enlarged, detail, vertical sectional view thereof, partly in elevation, taken upon the line 2—2, Fig. 3, and looking in the direction of the appended arrows; and, Fig. 3 is a detail, horizontal, sectional view, partly in elevation, taken upon the line 3—3, Fig. 2, and looking in the direction of the appended arrows.

Referring with particularity to the drawing, I have shown at A the forward or rearward portion of the body of an automobile of conventional type, having conventional rearward wheels, of which one, 4, is shown, running board 5, and fender 6. B designates the housing or casing of the signalling means which is divided generally into two compartments, a forward compartment 8 covered by a transparent, or translucent casing member 9, preferably of glass, and a rearward compartment 10, covered by a casing member 11, which may overlap and be secured to the casing member 9 as at 12, by suitable flanges 9a and 11a, through which, as at 12, may pass screws or other suitable securing devices. A further forward casing member 13 may be in a similar or other suitable manner secured to the lower portion of the casing member 9 as at 13a, and may extend downwardly for attachment to a member 14 of the body portion of the car as at 14a. The rearward portion of the casing member 11 may be similarly secured to the body member 14 at 14b. As indicated by the dotted lines in Fig. 2, the casing members 11 and 13 are formed with relatively thin walls except for internal ribs or bosses where the fastenings 14a and 14b are applied. There may likewise be provided an angular wall member 15 depending from a flange 15c secured as at 15a to the casing member 11, and depending in such position as to constitute the rear wall of the compartment 10, and being anchored forwardly to provide a bottom member 15b for both compartments 8 and 10, being secured to the casing or housing members 9 and 13 where they are joined together, at 13a. Between these forward and rearward compartments 8 and 10 constituting a common wall for both and preferably held in place at the top by the securing means at 12, is a translucent or transparent member 16, preferably a sheet of colored glass, whereby light from the rear compartment 10 may be emitted forwardly into and through the forward compartment 8 and given coloration by such member 16. Illuminating or lighting means C are provided in the rear compartment 10, and two sources of illumination are preferably included in such illuminating means C, being shown as electric bulbs, an upper one c and a lower one cc, and the upper one c may operate as an ordinary signal, as for instance as a tail light if at the rear of the vehicle, while the lower one cc cooperates with means D for intermittently interrupting the beam from the lower bulb cc, so as to produce a "flicker" of the light projected from such latter bulb, which "flicker" may be regulated as preferred, as for example to produce two hundred interruptions per minute or more or less as desired. The bulbs c and cc are respectively mounted in sockets 16' and 17, mounted in the compartment wall 15, and separate electrical paths 16a and 17a extend from same to switches 16b and 17b which may be controlled in any suitable manner for determining energization of the electric bulbs c and cc. Such a member (not shown) may be mounted upon the instrument board of the motor vehicle in any preferred manner and in accordance with usual practice, or otherwise. E designates a battery or other source of electrical supply which may be the source ordinarily present in motor vehicle practice for supplying electricity to the ignition and lighting circuits. The means D preferably includes a vane 18, preferably perpendicular in disposal and mounted upon or at the upper end of a shaft 19 which is operated by an electric motor or motor means F of any preferred construction or conventional construction, and which is energized through a branch electrical path 17c leading off from the electrical path 17a and commonly therewith controlled by the control means or switch 17b. The particular nature of the motor means F is not concerned in the invention, and any suitable motor means may be substituted for that in the drawing. The vane 18 preferably has louvre openings 20 which lower resistance of the vane to the surrounding atmosphere when the vane is rotated. When so rotated, at the same time that bulb cc is illuminated, such rotation causes intermittent interruption of the signal beam from such bulb cc or a "flicker" which strikingly appeals to the vision of pedestrians and vehicle drivers and the like, with its indication that the vehicle is about to turn in a given direction or be operated in accordance with the indication given by the signal means.

The form of the housing or casing member 9 is preferably one of curvature, so that the operation of the signal means may be viewed from both sides as well as both front and top and give full visibility in those respects. It is obvious that the signal means herein disclosed may be operated in the daytime without illumination, the movement of the member D being visible through the casing member, when made of transparent material, without such illumination. It is also obvious that as many of the signal means as desired or required may be used on a given motor vehicle and with the various signal means units may be correlated, interrelated and coordinated as desired, to effect the purposes of signalling required or desired in operation of the car.

The member 16 may be removed and other members substituted, of different nature or coloration, as deemed appropriate, so that the signal means may cast the color of beam believed best or most suitably adapted to the functioning of the device.

It is believed that the operation and method of use of the signal means is clear and fully to be understood from the foregoing description and statements taken in conjunction with the drawing.

It is obvious that various modifications and alterations and substitutions and variations may be made from the disclosures herein made and from the disclosure of the drawing, in adapting the invention to varying conditions of use and service and requirement or preference, without departing from the true and general nature of the invention.

Having thus disclosed my invention, I claim and desire to secure by Letters Patent:

1. A vehicle lamp comprising a casing including a top wall, side walls and front and rear end walls, said top wall and the upper portions of said side walls extending forwardly from said rear end wall and terminating in a vertical plane at right angles to the side walls of said casing and spaced rearwardly from the front end wall thereof, the lower portions of said side walls extending from end to end of said casing and between said plane and the front end wall having horizontally disposed top edges disposed in a common horizontal plane with the top edge of said front wall, a colored partition member through which light may pass extending transversely of said casing from side to side thereof and from the top wall thereof to the upper edges of the said lower portions of the side walls thereof and resting at its lower edge upon the upper edges of the said lower portions of said side walls and seated at its sides and top against the front edges of the upper portions of said side walls and the front edge of said top wall, respectively, a lens including a top wall, side walls and a front wall, the lower edge of the front wall of said lens being seated upon the upper edge of the front wall of said casing, the lower edges of the side walls of said lens being seated upon the upper edges of the said lower portions of the side walls of said casing, the rear edges of the top and the side walls of said lens being seated against the top and the side marginal portions, respectively, of said partition member, means fastening said lens removably in assembly with said casing and thereby fastening said partition member removably, replaceably assembled with said casing, and light means mounted in said casing rearwardly of said partition member.

2. A vehicle lamp as set forth in claim 1 in which the casing is open at its bottom to be closed by the part of a vehicle upon which the lamp is mounted and to afford ready access to the interior of said casing when the lamp is removed from the vehicle.

CHUJIRO GENDA.